United States Patent [19]
Jano et al.

[11] Patent Number: 5,259,567
[45] Date of Patent: Nov. 9, 1993

[54] OPTICAL DEVICE FOR MEASURING THE ROLL ANGLE OF A PROJECTILE

[75] Inventors: Patrice Jano, Seine Port; Jean-Pierre Brasile, Gif S/Yvette; Thibaut de Saxce, Palaiseau, all of France

[73] Assignee: Thomson-CSF, Puteaux, France

[21] Appl. No.: 848,981

[22] PCT Filed: Nov. 8, 1991

[86] PCT No.: PCT/FR91/00875

§ 371 Date: Apr. 20, 1992

§ 102(e) Date: Apr. 20, 1992

[30] Foreign Application Priority Data

Nov. 9, 1990 [FR] France .................. 90 13939

[51] Int. Cl.$^5$ ............................................. F41G 7/00
[52] U.S. Cl. ............................................... 244/3.11
[58] Field of Search .................. 244/3.11, 3.16, 3.13

[56] References Cited

U.S. PATENT DOCUMENTS

| | | | |
|---|---|---|---|
| 3,757,632 | 9/1973 | Bellinger | 89/1.1 |
| 3,963,195 | 6/1976 | Coxe et al. | 244/3.11 |
| 4,003,659 | 1/1977 | Conard et al. | 244/3.11 |
| 4,072,281 | 2/1978 | Miller, Jr. et al. | 244/3.16 |
| 4,097,007 | 6/1978 | Fagan et al. | 244/3.11 |
| 4,219,170 | 8/1980 | Esker | 244/3.14 |
| 5,039,029 | 8/1991 | Taylor et al. | 244/3.11 |

FOREIGN PATENT DOCUMENTS 0345093 12/1989 European Pat. Off. .
2236925  4/1991 United Kingdom .

*Primary Examiner*—Ian J. Lobo
*Attorney, Agent, or Firm*—Pollock, Vande Sande & Priddy

[57] ABSTRACT

This optical device comprises, at the rear of the projectile (3), a catadioptric system (15) equipped with a polariser (16) and, at the firing station of the projectile (3), a light source (5) whose beam illuminates the rear of the projectile (3) and a light-flux analyzer (6) calculating from the polarization direction of the light flux reflected by the projectile (3) the roll angle of the latter. It is noteworthy in that it comprises, in order to remove the ambiguity of $\pi$ from the measurement of the roll angle, a reflector dihedron (20) which is positioned along the side of the projectile and which reflects the light beam from the source (5) back to the light-flux analyzer (6) once per turn of the roll of the projectile (3) when the light source (5) is not blocked from it by the body of the projectile (3).

2 Claims, 4 Drawing Sheets

OPTICAL DEVICE FOR MEASURING THE ROLL ANGLE OF A PROJECTILE

FIELD OF THE INVENTION

The present invention relates to the measurement of the roll angle of a projectile.

BACKGROUND OF THE INVENTION

The general evolution in threat and weapon systems raises the need for improving the performance of weapons by virtue of a guiding system whilst seeking a minimum cost.

It is particularly advantageous, then, to reduce as far as possible the amount of sophisticated equipment loaded on board an expendable guided projectile (computer, homing head, inertial unit, proximity fuse etc.) by transferring the maximum number of functions to the firing station alone.

The guidance of a guided weapon launched by a conventional or electromagnetic gun and set into a rotation movement about its axis, may be performed with the aid of gas-generating lateral impellers, the operation of which is actuated when they are oriented in the desired direction. This requires knowing at any instant the roll angle of the projectile.

This function of angular measurement of the roll is generally ensured by an inertial unit (rate-gyro) loaded on board the projectile, which inertial unit is expensive and expendable. Furthermore, this inertial unit becomes difficult to design and to construct in the case of a projectile launched by an electromagnetic gun where the acceleration at the start may reach 200,000 g.

It is known how to measure the roll angle of a projectile with the aid of a catadioptric system equipped with a polarizer disposed at the rear of the projectile, with a light source illuminating the rear of the projectile and a light analyzer calculating the roll angle of the projectile from the polarisation direction of the light flux reflected by the rear of this projectile. However, this measurement has the drawback of exhibiting an ambiguity of $\pi$.

BRIEF DESCRIPTION OF THE INVENTION

The object of the present invention is to enable ambiguity in an optical measurement of the roll angle of a projectile to be removed with the aid of components loaded on board the projectile which are robust, reliable and inexpensive.

The subject of this invention is an optical device for measuring the roll angle of a projectile launched by launching means located in a firing station. This device comprises, at the rear of the projectile, a catadioptric system equipped with a polarizer and, at the firing station, a light source which is laterally offset in relation to the firing axis of the projectile and whose beam illuminates the rear of the projectile, and a light-flux analyzer calculating, from the polarization direction of the light flux reflected by the rear of the projectile, the roll angle of the latter. It is noteworthy in that it furthermore comprises a reflector dihedron which is positioned along the side of the projectile and turned towards the rear of the latter with its edge normal to the rotation axis of the roll of the projectile and which reflects the light beam from the source back to the light-flux analyzer once per turn of the roll of the projectile when the light source is not occulted from it by the body of the projectile.

The catadioptric system may be a reflector trihedron.

The light-flux analyzer comprises a first optical receiver which is sensitive to the intensity of the light flux and which receives the light flux reflected by the projectile by the agency of a polarizer constituting a polarization analyzer, a second optical receiver which is also sensitive to the intensity of the light flux and which is directly exposed to the light flux reflected by the projectile, a turbulence-compensating circuit splitting the signal supplied by the first optical receiver from the signal supplied by the second optical receiver and a circuit for estimating the roll angle of the projectile employing the signal supplied by the turbulence-compensating circuit.

Other characteristics and advantages of the invention will emerge from the description of embodiments given by way of example. This description will be made hereinbelow, with respect to the drawing in which:

BRIEF DESCRIPTION OF THE FIGURES

In the drawing, the identical elements from one figure to another are indexed by the same references.

DETAILED DESCRIPTION OF THE INVENTION

Figure 1:
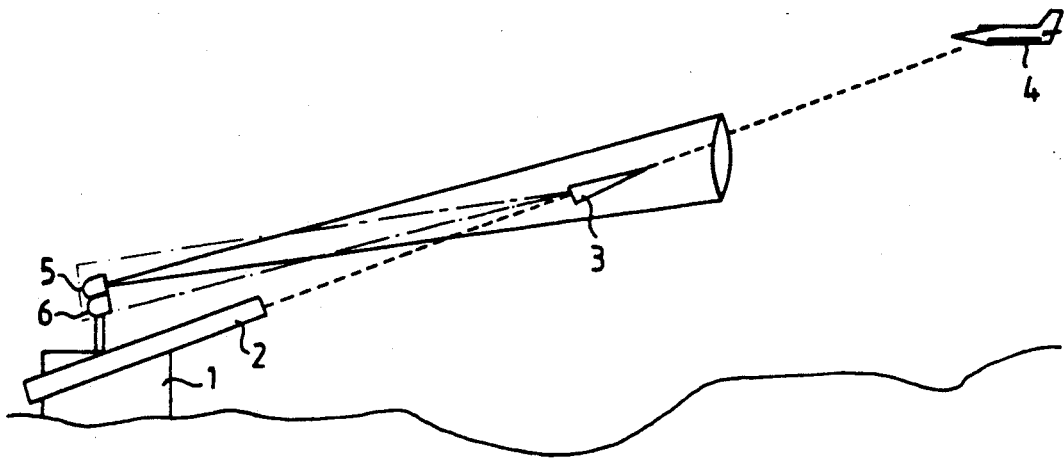
FIG. 1 shows an overall diagram of a guided-projectile firing station equipped with an optical device according to the invention.

FIG. 1 shows a firing station 1 equipped with a gun 2 having just launched a guided projectile 3 in the direction of a target 4. The optical device for measuring roll angle of the guided projectile 3 comprises, at the firing station 1, a light source 5 consisting of a laser pointed at the guided projectile 3 and a light-flux analyzer 6 which is mechanically coupled to the light source 5 and which analyses the polarisation direction of the light flux reflected by the guided projectile 3 in order thereby to calculate at any instant its roll angle.

The laser constituting the light source 5 is pointed at the guided projectile 3 by a conventional trajectography system. Moreover, it operates in pulse mode in order to transmit guidance commands to the guided projectile 3.

Figure 2:
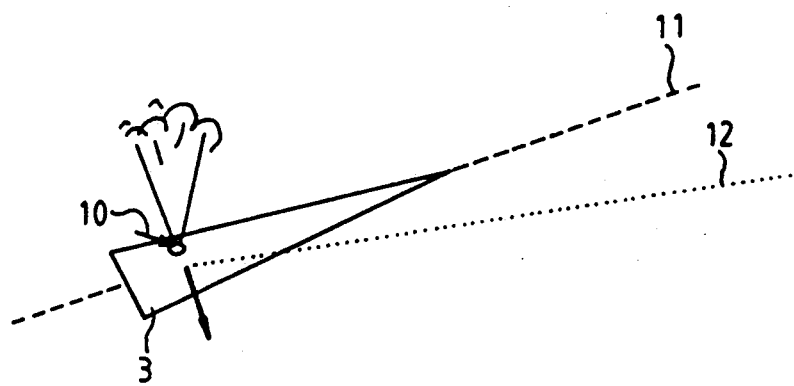
FIG. 2 represents, diagrammatically, a guided projectile with its trajectory-changing means.

The guided projectile 3 is ejected from the gun 2 with a roll rotation movement. It comprises, as represented in FIG. 2, at least one lateral impeller consisting of a lateral gas-ejection orifice 10 which may be placed at the center of gravity and which is coupled to a gas generator loaded on board the projectile by the agency of a valve opened by pulses under the control of a guidance device responding to the commands transmitted by the pulses from the laser. On instruction, the valve allows a blast of propelling gas to escape during a very short period of time via the lateral ejection orifice. This moves the projectile 3 laterally, which is caused to deviate towards the direction in which the thrust from the gas blast has taken place and departs from its former trajectory 11 in order to adopt a new trajectory 12. Of course, in order to be able to use the lateral impeller or impellers judiciously, it is necessary to know the roll angle of the projectile 3 at any instant.

Figure 3:
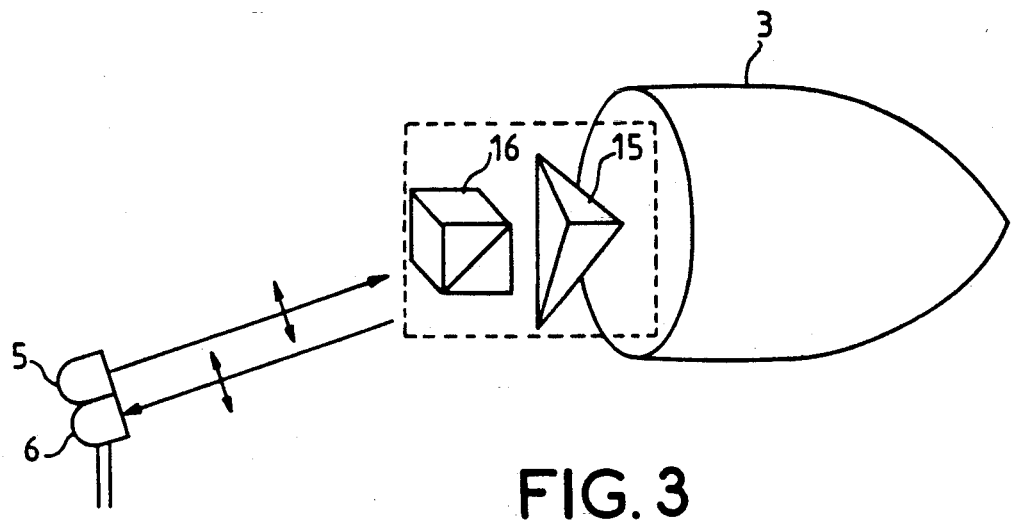
FIG. 3 represents, diagrammatically, the main elements of the optical device according to the invention.

In order to achieve this, the guided projectile 3 comprises, on its rear face, as represented in FIG. 3, a catadioptric system 15 equipped with a polarizer 16.

This catadioptric system 15 may be, as represented, a reflector trihedron produced with the aid of a cube corner. This is an optical invariant which reflects the light beams received back in their directions of incidence. The polarizer 16 only allows the component of a light beam to pass which has a linear polarization parallel to its own polarization direction which is tied to the attitude of the projectile.

Figure 4:
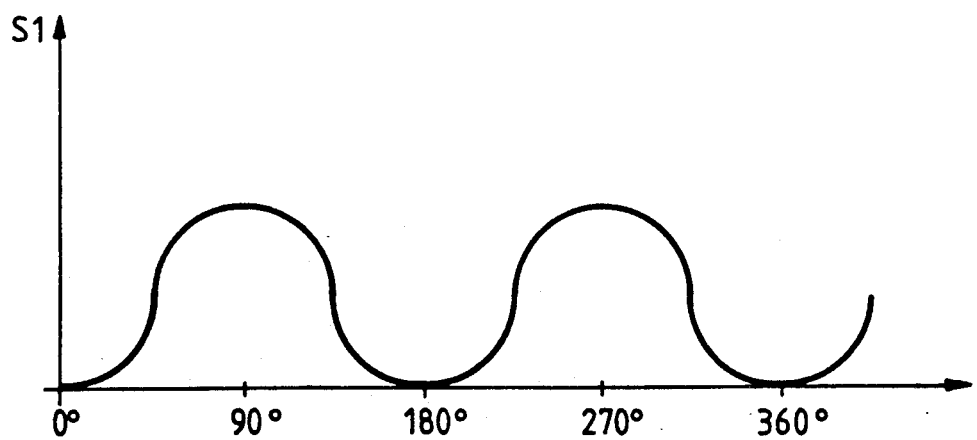
FIG. 4 is a graph illustrating the light-flux intensity variations which are detected in the optical device according to the invention as a function of the roll angle of the projectile.

With a light source 5 generating an incident beam having a vertical linear polarization, the polarizer 16 only allows the beam to pass completely when its polarization direction is vertical, which occurs twice per turn of the roll of the projectile 3. At this moment, the catadioptric system 15 receives the beam from the light source 5 without it being attenuated by the polarizer 16 and reflects it back in its direction of incidence to the light-flux analyser 6 independently of the attitude of the projectile according to the other pitch and yaw angles. As the projectile rotates about itself, the polarizer 16 causes the intensity of the flux of the light source 5 reflected back to the light-flux analyzer 6 to vary, as represented in FIG. 4, according to a sine-squared law of frequency twice the rotation frequency of the projectile about the roll axis. This sine-squared wave is phase-locked to within, with maxima corresponding to the polarization direction of the polarizer 16 passing through the vertical. By graduating from 0 to 2 the curve of intensity variation of the light flux reflected by the projectile 3, as has been done in FIG. 4, it is therefore possible to know at any instant the roll angle of the projectile 3. This is what is carried out by the light-flux analyzer 6 by means of conventional filtering techniques. The uncertainty of in the phase locking may be removed by a trial of one impeller and by detecting, by trajectography, the direction of the deviation caused to the trajectory of the projectile.

The light source 5 may also generate a circularly-polarized beam. The light-beam analyzer 6 then comprises a polarizer disposed as polarization analyzer in front of an optical receiver sensitive to the intensity of the light flux received. As in the previous case, the intensity of the light flux detected by the optical receiver varies according to a sine-squared wave of frequency twice the rotation frequency of the projectile about the roll axis.

The measurement of the roll angle of the projectile can be disturbed by inopportune variations in the intensity of the light flux reflected by the projectile because of the presence of natural turbulence or turbulence caused by the wake of the projectile. However, it is possible to compensate for this, as is shown by the optical device for measuring the roll angle in FIG. 5.

Figure 5:
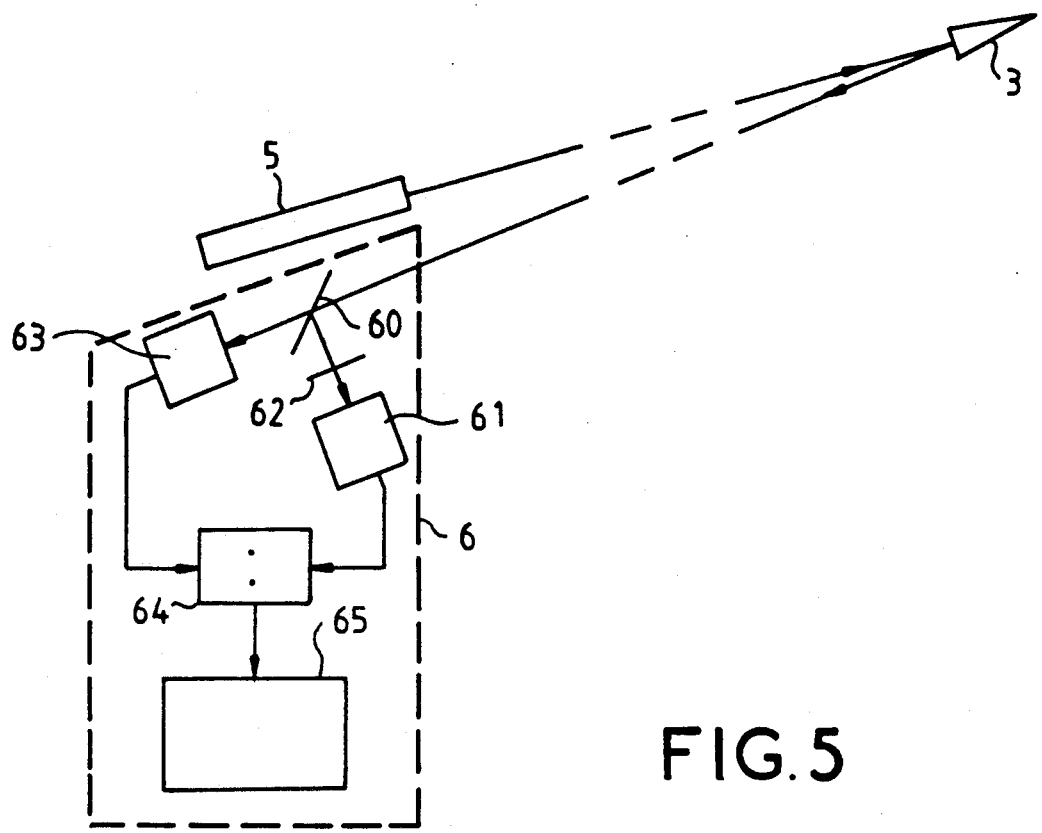
FIG. 5 represents, diagrammatically, the main elements of an optical device according to the invention, provided with turbulence-compensating means.

This FIG. 5 shows a light source 5 which illuminates a guided projectile 3 and which is located at a firing station, in the vicinity of a light-flux analyzer 6 analyzing the flux of the light source 5 reflected by the projectile 3 in order to calculate therefrom the roll angle of the projectile 3 at any instant.

The light source 5 is a laser which generates a circularly-polarized light beam.

The projectile 3 carries, on its rear face, a catadioptric system equipped with a polarizer, which are not visible in FIG. 5, such that it reflects back to the light-flux analyzer 6 a linearly-polarized light flux whose polarization direction depends on its roll angle.

The light-flux analyzer 6 comprises: a splitter 60 such as a semi-transparent mirror which splits the light flux reflected back by the projectile 3 into two equal portions, a first optical receiver 61 preceded by a polarizer 62 which intercepts that one of the portions of the light flux which is supplied by the semi transparent mirror 60, a second optical receiver 63 which directly intercepts that other portion of the light flux which is supplied by the semi transparent mirror 60, a turbulence-compensating circuit 64 dividing the signal supplied by the first optical receiver 61 by the signal supplied by the second optical receiver 63 and a circuit 65 for estimating roll angle employing the signal supplied by the turbulence-compensating circuit 64.

The two optical receivers 61, 63 may also be juxtaposed, which avoids the use of the splitter.

Optionally, the splitter 60 and the polarizer 62 may be one and the same device.

The polarizer 62 operates as a polarization analyzer. It allows that portion of the light flux to pass which reaches it coming from the projectile 3 if the linear polarization of this portion is parallel to its polarization direction, blocks it if the linear polarization of this portion is perpendicular to its polarization direction and, in the other intermediate cases, only allows a proportion to pass whose magnitude depends on the angle between the polarization directions according to an aforementioned sine-squared law.

Figure 6:
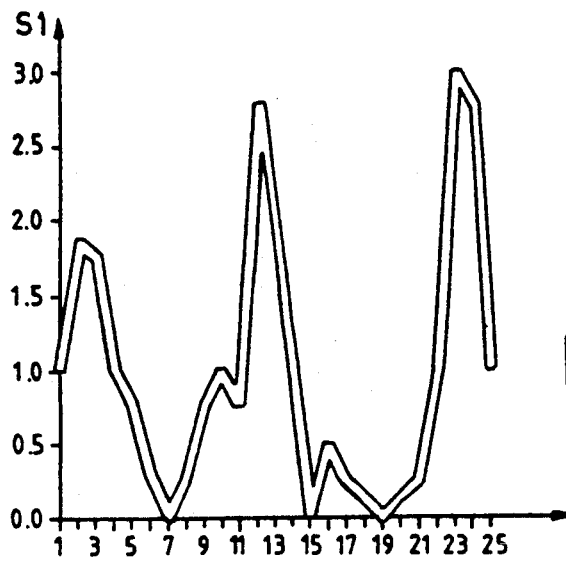
FIGS. 6, 7, 8 are graphs illustrating the operation of the optical device represented in FIG. 5

The first optical receiver 61, which is sensitive to the intensity of the light flux received by the agency of the polarizer 62, supplies an output signal S1 whose amplitude represented in FIG. 6 varies as a sine-squared wave of frequency twice the rotation frequency of the projectile about the roll axis, which curve is modified by a significant parasitic modulation due to fluctuations of light intensity of the beam reflected by the projectile because of natural turbulence and turbulence caused by the wake of the projectile.

Figure 7:
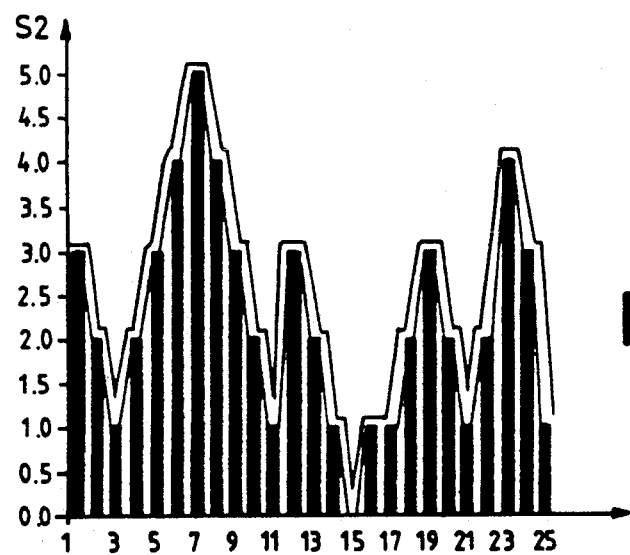

The second optical receiver 63, which is directly sensitive to the intensity of the light beam reflected by the projectile, supplies an output signal S2 whose amplitude represented in FIG. 7 is insensitive to change in the polarization direction of the beam and depends solely on intensity fluctuations of the beam due to turbulence.

Figure 8:
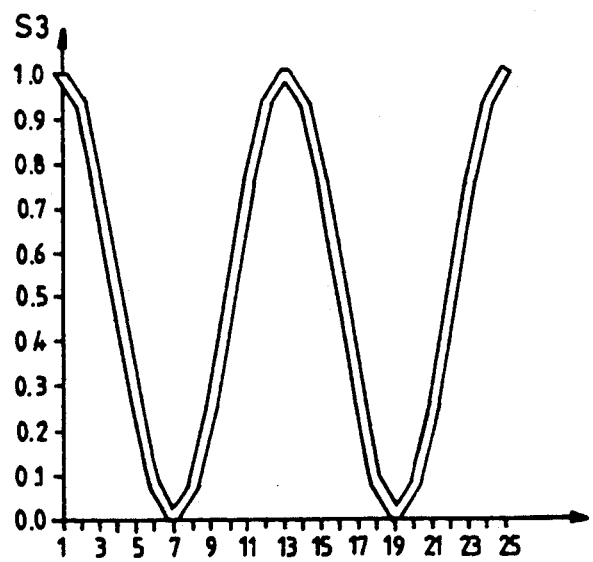

The turbulence-compensating circuit 64, by dividing the signal S1 which is amplitude modulated by the rotation about the roll axis of the projectile and by the turbulence, by the signal S2 which is modulated only by the turbulence, enables a signal S3 to be obtained whose amplitude represented in FIG. 8 varies only as a function of the roll angle of the projectile, as a sine-squared wave of frequency twice the rotation frequency of the projectile.

The circuit 65 for estimating the roll angle is a conventional filtering device circuit which employs, for example, a predictive filter centered on twice the rotation frequency of roll of the projectile, which is known at the start when the projectile leaves the gun.

Figure 9:
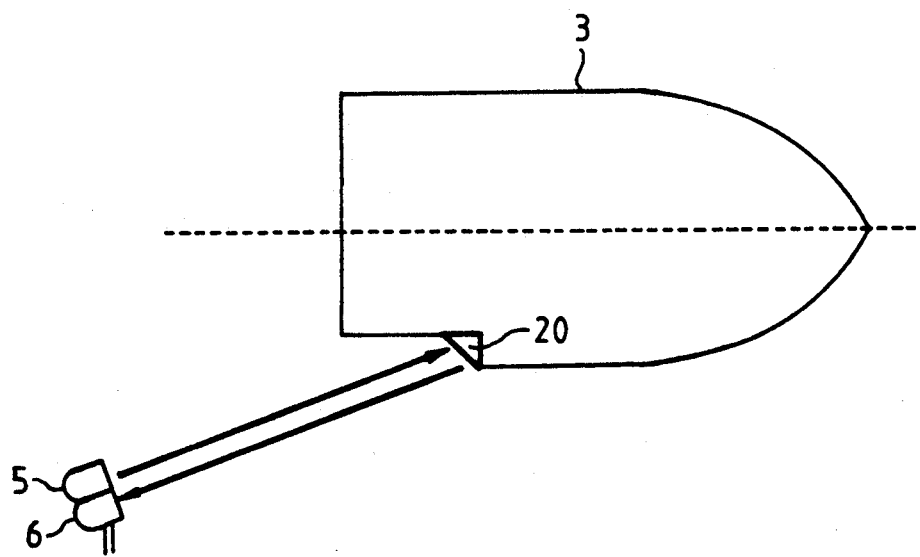
FIG. 9 represents, diagrammatically, a complementary optical device enabling an ambiguity of $\pi$ in the measurement of the roll angle of the projectile to be removed.

FIG. 9 illustrates a complementary optical device which enables, when the light source 5 and the light-flux analyzer 6 are laterally offset in relation to the firing axis of the projectile 3, the ambiguity of to be removed from the measurement of the roll angle of the projectile 3 from the light flux reflected by the catadioptric system equipped with the polarizer without having to carry out the trial of an impeller.

This complementary device consists of a reflector dihedron 20, for example a 90° prism, positioned on the side of the projectile 3 and turned towards the rear of the latter, with its edge normal to the axis of the roll-type rotation of the projectile 3. The reflector dihedron 20 reflects according to the axis of incidence only the light rays arriving perpendicularly to its edge. The light rays emitted in its direction by the light source 5, which is laterally offset in relation to the firing axis of the projectile 3, are only perpendicular to its edge twice during each turn of the roll of the projectile 3. As on one of these occasions it is hidden from the light source 5 and from the light-flux analyzer 6 by the body of the projectile 3, it reflects the beam from the light source 5 back to the light-beam analyzer 6 only once per turn of the roll of the projectile while the latter has a particular roll angle. The accuracy is tied to the divergence of the light source 5 which, in any case, has to be small in order to have a long range.

By virtue of the reflector dihedron 20, the light-beam analyzer 6 receives, in addition to the light flux reflected by the catadioptric system equipped with the polarizer, a light pulse which appears on each turn of the roll of the projectile for a particular value of the roll angle and which enables the ambiguity of $\pi$ to be removed from the measurement.

From the moment of its departure, the projectile is illuminated by the beam from the light source. The light-flux analyzer receives a light flux reflected back by the catadioptric system equipped with a polarizer and light pulses reflected back by the reflector dihedron 40 which enable the roll angle to be measured without ambiguity. When the projectile gets further away, the light pulses reduce in intensity and the phase is maintained by predictive filtering centred on twice the rotation frequency.

The optical roll-angle measurement device which has just been described has the advantage of transferring all the complexity, that is to say the processing circuits, to the firing station and not onto the expendable projectile. The components on the projectile are simple and robust and they withstand the high acceleration.

We claim:

1. An optical system for measuring the roll angle of a projectile, comprising:
    means for launching the projectile;
    a light source located at the launching means for projecting a light beam toward a launched projectile, along an axis laterally offset from an axis of the beam, and illuminating the rear of the projectile;
    catadioptric means mounted to the rear of the projectile for reflecting light back from the source;
    a polarizer located at the rear of the projectile, intermediate the catadioptric means and the launching means, for polarizing light reflected back toward the launching means;
    a dihedron reflector positioned on a radially outward section of the projectile, and having an edge normal to the roll angle of the projectile, for producing a pulse of light reflected back to the source, once for each complete roll of the projectile, when the source and dihedron reflector are unobstructed by the projectile body;
    and light flux analyzer means located at the launching means for calculating projectile roll angle from the polarization direction of the light flux reflected back from both the catadioptric means and the dihedron reflector, at the rear of the projectile.

2. The system set forth in claim 1 wherein the flux analyzer means comprises:
    first optical means for measuring the light flux directly reflected from the rear of the projectile;
    second optical means for measuring the polarized light flux reflected from the rear of the projectile, via the polarizer;
    first circuit means compensating for the fluctuations of light flux due to turbulence, and splitting a signal supplied by the second optical means; and
    second circuit means, utilizing a signal from the first circuit means for calculating the roll angle.

* * * * *